(12) United States Patent
Armitage (10) Patent No.: US 6,191,848 B1
(45) Date of Patent: Feb. 20, 2001

(54) LASER SENSOR HOLDER

(75) Inventor: Robert K. Armitage, West Yorkshire (GB)

(73) Assignee: Kodak Polychrome Graphics LLC, Norwalk, CT (US)

(*) Notice: Under 35 U.S.C. 154(b), the term of this patent shall be extended for 0 days.

(21) Appl. No.: 09/292,450

(22) Filed: Apr. 15, 1999

(51) Int. Cl.$^7$ .................................................. G01J 1/00
(52) U.S. Cl. .................... 356/213; 356/218; 359/873; 372/107; 250/560
(58) Field of Search .................... 356/213, 218, 356/220, 221, 226, 227, 233, 228, 216, 375, 372, 376; 359/288, 873; 250/560, 561, 562, 563; 372/107

(56) References Cited

U.S. PATENT DOCUMENTS

| | | | |
|---|---|---|---|
| 3,864,029 | * | 2/1975 | Mohler .................... 359/873 |
| 3,966,325 | * | 6/1976 | Mohler .................... 356/218 |
| 4,474,468 | * | 10/1984 | Shirakura et al. .......... 356/375 |
| 4,721,388 | * | 1/1988 | Takagi et al. ............. 356/376 |
| 4,838,696 | * | 6/1989 | Pryor .................... 356/375 |
| 4,865,446 | * | 9/1989 | Inoue et al. ............. 356/216 |
| 5,291,270 | * | 3/1994 | Koch et al. .............. 356/372 |

* cited by examiner

Primary Examiner—Frank G. Font
Assistant Examiner—Sang H. Nguyen
(74) Attorney, Agent, or Firm—Baker Botts L.L.P.

(57) ABSTRACT

A laser sensor holder apparatus for enabling a power sensor to be held in the path of a laser beam to measure the beams power comprises a base unit including a mounting frame, and translation stages to enable the movement of a sensor mounting plate to a desired position in the path of a laser beam. The apparatus is useful in measuring the power of a laser beam. Applications of the apparatus include its use in direct imaging systems whereby the previous method of manually holding a power sensor in the path of a class 4 laser and all of its inherent disadvantages may be avoided.

19 Claims, 6 Drawing Sheets

# LASER SENSOR HOLDER

BACKGROUND OF THE INVENTION

The invention relates to a laser sensor holder apparatus, and in particular to such an apparatus for use in conjunction with power monitoring of laser beams, and to a method of measuring the power of a laser beam.

Laser power units, for example laser power units which emit laser beams for use in lithographic plate imprinting, are frequently used in situations in which beam strengths are occasionally varied and need to be checked prior to use or in which the beam strength needs to be regularly measured and precisely calibrated. There is therefore a need for a means of regular monitoring and calibrating.

Suitable power sensors are usually employed in order to monitor the strength of the beam for each application and check that the beam has been calibrated to within acceptable limits. Calibration may involve taking multiple readings, interspersed with computer controlled adjustment of the beam strength.

In known arrangements, sensors employed to monitor and calibrate the beams are usually hand-held, requiring a user to stand in front or to one side of the laser power unit, holding the sensor in the path of the beam. There are a number of inherent disadvantages with this method of monitoring.

One disadvantage is that the user will never be able to keep the sensor in a totally stationary position and therefore, for any one sensor reading, there may be fluctuations as the sensor moves from the centre of the beam to its periphery and back again.

A second disadvantage is that after each sensor reading the user must move to a computer terminal to input data and adjust the power output of the laser up or down accordingly before returning to the beam area once more to check the actual effect of the adjustments. When the user returns to the sensor to take the next reading, he will not be able to hold the sensor in exactly the same position as in the previous reading. Even if the laser power has not been changed the new position of the sensor, coupled with the instability of the hand-held sensors position, can lead to significantly erroneous readings.

The need for the user to undergo repetition of sensor reading, moving to the computer terminal, inputting data and returning to the sensor, means valuable time is wasted. Indeed for many applications, calibration in this manner can take up to half a day to complete.

As the user must hold sensors of known arrangement in his hand, there is a high risk that the laser beam could come into contact with the skin of his hand. Some applications require the use of powerful (class 4) lasers which would cause serious burns and tissue damage if there is any beam to skin contact.

It is therefore a first object of the present invention to provide a laser power sensor holder which is designed to be coupled with a laser power sensor and secured in the path of a beam.

It is further an aim of preferred embodiments of the present invention to provide a sensor holder which can be adjusted, when attached to a laser power unit, such that the sensor element of the coupled sensor is stationary and exposed to the whole cross-section of the beam and is thereby eliminating inaccurate readings caused by the sensor missing parts of the beam caused by movement of the sensor during operation.

It is another aim of preferred embodiments of the present invention to provide a sensor holder which permits the elimination of time-wasting caused by repeated movement between the sensor and a power controller of the laser.

SUMMARY OF THE INVENTION

A sensor holder apparatus for a laser power sensor comprises: a base unit arranged for mounting on a supporting surface; sensor mounting means arranged to be coupled to a laser power sensor; and attachment means for movably attaching the sensor mounting means to the bas unit, the attachment means being arranged for movement of the sensor mounting means into a position in which the sensor can be positioned in the path of a laser beam to be monitored and exposed to the whole cross-section of the laser beam.

A method of measuring the power of a laser beam comprises mounting a sensor holder apparatus on a supporting surface of a laser beam unit, the sensor apparatus comprising a base unit arranged for mounting on a supporting surface; sensor mounting means arranged to be coupled to a laser power sensor; and attachment means for movably attaching the sensor mounting means to the base unit, the attachment means being arranged for movement of the sensor mounting means into a position in which the sensor can be positioned in the path of a laser beam to be monitored and exposed to the whole cross-section of the laser beam; associating a laser power sensor with sensor mounting means of the sensor holder; manipulating attachment means of the sensor holder so as to bring about movement of the laser power sensor into a position in which the sensor is in the path of a laser beam and exposed to the whole cross-section of the laser beam to be monitored; and obtaining a power reading from the laser power sensor.

DETAILED DESCRIPTION OF THE INVENTION

According to a first aspect of the invention, there is provided a sensor holder apparatus for a laser power sensor, the apparatus comprising: a base unit arranged for mounting on a supporting surface; a sensor mounting means arranged to be coupled to a laser power sensor; and attachment means for movably attaching the sensor mounting means to the base unit, the attachment means being arranged for movement of the sensor mounting means into a position in which the sensor can be positioned in the path of a laser beam to be monitored and so as to be exposed to the whole cross-section of the laser beam.

Preferably, the supporting surface comprises a surface of a laser beam unit but may be any surface which is suitable for mounting of the apparatus and which is within sufficient proximity of the laser beam to be monitored. The surface may be a top surface of the laser beam unit. The laser beam unit may be of the type used in a direct imaging system.

The attachment means preferably facilitates movement of the sensor mounting means in at least one and preferably three dimensions. The attachment means may comprise three translation stages, each translation stage being arranged to move the sensor mounting means along a different axis of movement. Preferably, the three axes of movement are mutually perpendicular.

The supporting surface is preferably a substantially flat surface of the laser beam unit.

The base unit preferably comprises a frame for attachment to the supporting surface and providing a datum for manipulation of the attachment means.

The supporting surface may be non-flat and the base unit may comprise a first portion for coupling to the supporting surface and a second portion comprising a frame which is fixedly attached to or integral with the first portion and which provides a datum for manipulation of the attachment means.

A first and a second of the translation stages may be stacked on the upper surface of the frame, and may be movably coupled to each other. The first translation stage is preferably coupled to the frame and the second translation stage is preferably coupled to the first translation stage.

The third translation stage is preferably attached to the sensor mounting means and may be movably coupled to the first or the second translation stage such that it overhangs an edge of the base unit.

The third translation stage and the respective first or second translation stages may be coupled together by any suitable means, such as a bridging member.

The bridging member may be integral with the respective first or second translation stage or may be coupled to the respective first or second translation stage.

The third translation stage may be integral with the sensor mounting means. Alternatively, the third translation stage may be coupled to the sensor mounting means.

The sensor mounting means may comprise a mounting plate.

The mounting plate may include any suitable means for mounting a sensor, such as bolt holes or sockets.

Adjustment means may be provided in order to effect movement of the translation stages.

There may be a separate adjustment means for each of the translation stages.

Rotational movement of the adjustment means may translate into linear movement of its respective translation stage.

The adjustment means may comprise any suitable means such as adjustment screws.

The adjustment means may include an imprinted visual scale for calibration purposes.

The visual scale may comprise a micrometer scale or may comprise a Vernier scale.

By use of the adjustment means, the sensor mounting means may be moved to bring the power sensor into the beam path so that the sensor is exposed to the full cross-section of the beam.

The first and second translation stages may be arranged to provide movement of the sensor mounting means in left/right and front/back directions of a nominally horizontal plane and the third translation stage may be arranged for up/down movement.

The mounting frame may include a level adjustment means in order to ensure the sensor holder is level horizontally on a surface on which it is positioned. The level adjustment means may comprise adjustable feet.

The sensor holder may be capable of being partially dismantled so that at least part of the base unit is retained permanently mounted to the supporting surface whilst one or more other parts of the apparatus may be removed from said base unit or said part of said base unit when the apparatus is not required to be used. Partial dismantling of the sensor holder apparatus may be preferred so that after use the sensor and sensor mounting means can be removed from the path of the beam without the need to remove the entire sensor holder.

The sensor holder may be capable of being fully dismantled so that it may be efficiently stored during periods of non-use.

The sensor holder may be constructed of any suitable material such as metal, plastics material or composite material.

The invention includes a laser beam unit having a laser and at least a supporting surface adjacent to a laser beam emitting part, wherein said laser beam unit further includes a sensor holder apparatus according to the first aspect.

According to a further aspect of the invention, there is provided a method of measuring the power of a laser beam, the method comprising: mounting a sensor holder apparatus according to the first aspect on a supporting surface of the laser beam unit; associating a laser power sensor with the sensor mounting means of the sensor holder; manipulating attachment means of the sensor holder so as to bring about movement of the laser power sensor into a position in which the sensor is in the path of a laser beam and exposed to the whole cross-section of the laser beam to be monitored; and taking a power reading from the laser power sensor.

Preferably, following measurements of the power of the laser beam, the power is adjusted upwardly or downwardly, according to a desired output power.

Preferably, laser readings from the power sensor are processed by processing means and displayed on a display unit and subsequent adjustment of the power output of the laser beam unit is also effected by said processing means such that the effect of power adjustments is directly visible on the display unit, avoiding the necessity for an operator to move iteratively between the laser beam unit, processing means and display.

Preferably, the processing means and display unit are embodied in a personal computer.

For a better understanding of the invention, and to show how embodiments of the same may be carried into effect, reference will now be made, by way of example, to the accompanying diagrammatic drawings.

Figure 1A:
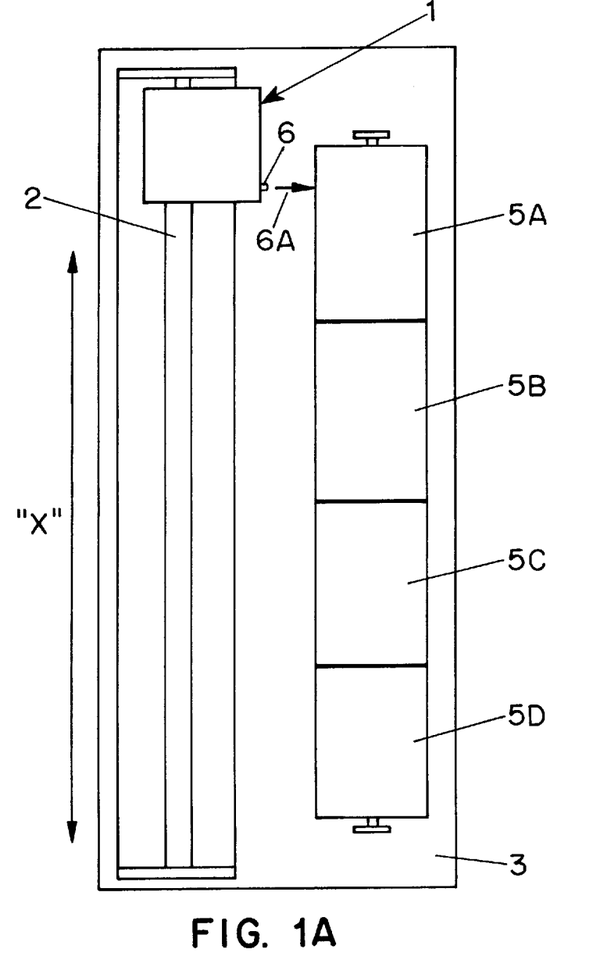
FIGS. 1A and B are plan and side views respectively of a direct print imaging system using a laser beam unit.
Figure 1B:
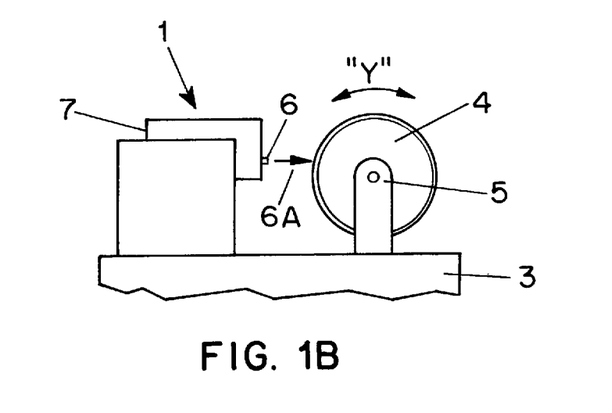

Referring initially to FIGS. 1A and 1B, there is shown apparatus for the direct imaging on lithographic printing plates by laser. Such apparatus comprises a laser beam unit 1 mounted for movement along a track 2 in a computer controlled fashion along a horizontal axis in either of the directions indicated by double headed arrow "X". The track 2 is supported by a base 3 which also supports a cylinder 4 capable of rotation in the directions shown by double headed arrow "Y"(shown in FIG. 1B). Rotation in the directions Y is about a supporting axis 5 with rotation of the cylinder 4 again being computer controlled. The cylinder 4 which is in parallel relation to the track 2, supports printing plates 5A to 5D. The printing plates have a desired pattern formed upon them by a laser beam 6A which is emitted by the laser beam unit 1 from a position shown by reference numeral 6. By using computer control of the laser to turn it on and off, to move the beam unit 1 up or down along axis "X" as required and to rotate the cylinder 4 in any desired fashion, any point on the plates 5A to 5D may be arranged to have the laser beam incident upon it. The laser beam is a class 4 laser which is arranged to directly form an image on the printing plate, which can then be used in a conventional process for the printing of, for instance, newspapers etc.

As mentioned previously, such types of "direct imaging" system are now quite well known in the art. However, in all instances known to the inventor, these is no reliable method of measuring power output of the laser beam 6A without incurring the disadvantages described earlier.

Figure 2A:
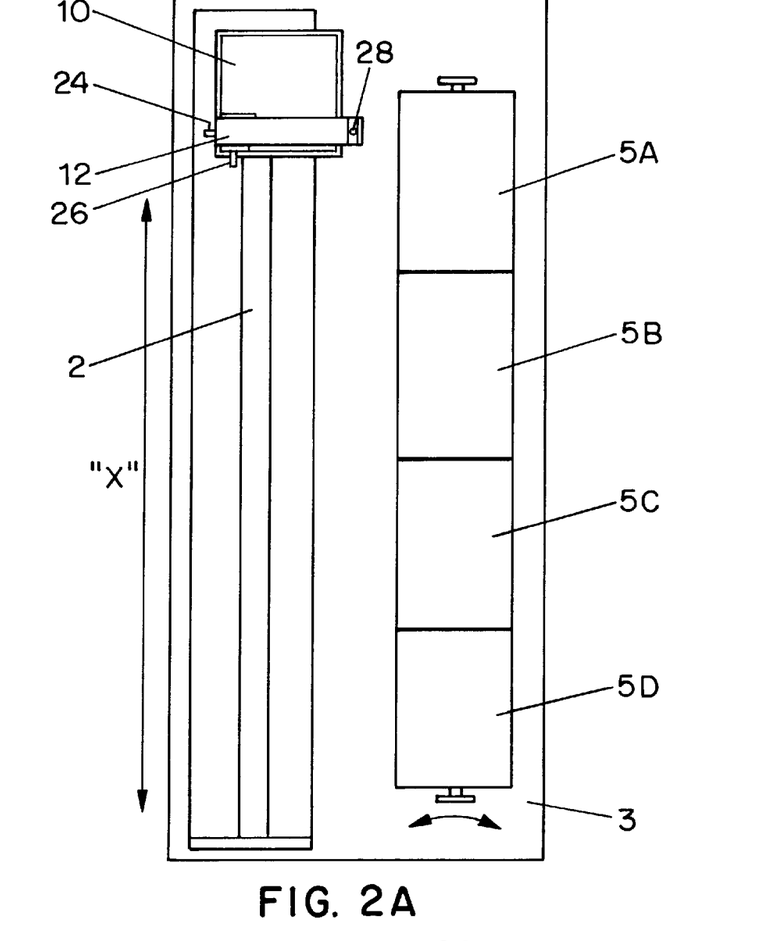
FIGS. 2A and 2B are similar views to those of FIG. 1, but showing a laser holder in accordance with a preferred embodiment of the invention mounted on the laser beam unit of the print imaging system.
Figure 2B:
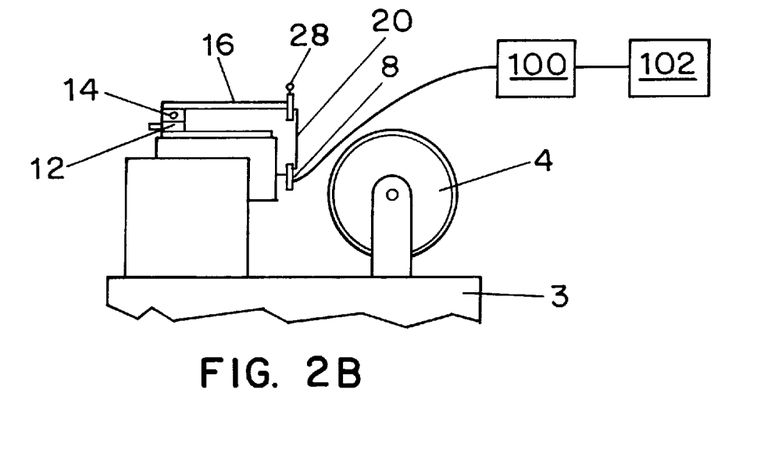
Figure 3:
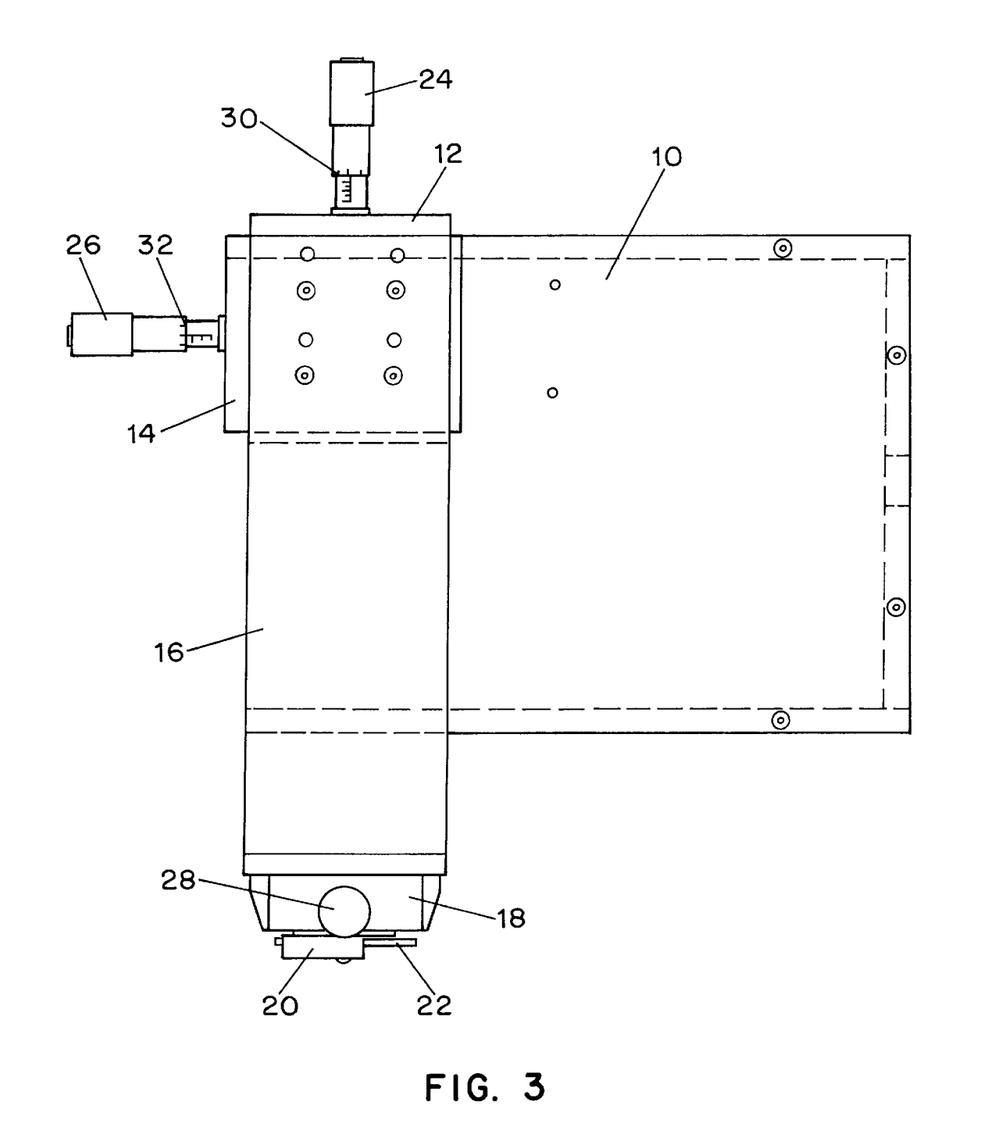
FIG. 3 is a plan view of a preferred embodiment of a sensor holder apparatus according to the present invention.

Referring now to FIGS. 2A and 2B, the problems and disadvantages of the conventional system are addressed by sensor holder apparatus described in detail hereafter which is arranged to be mounted upon a flat top surface 7 of the laser beam unit 1.

Referring to FIGS. 3 to 6 in conjunction with FIGS. 2A and 2B, the sensor holder apparatus comprises a base unit in the form of a mounting frame 10, which in use is placed horizontally on a flat horizontal top surface 7 of a laser beam unit 1 or similar machine. Also provided on the mounting frame are stacked translation stages 12 and 14 which are movable in mutually perpendicular directions to each other along axes running in the same plane as the main horizontal plane of mounting frame 10. In order to effect this movement, translation stages 12 and 14 are provided with adjustment screws 24 and 26 respectively, which translate rotational movement of the screw into linear movement of the corresponding translation stage.

Uppermost translation stage 14 is coupled to a bridging arm 16 which protrudes horizontally over one edge of the mounting frame 10. Attached to the outermost edge of the bridging arm is end plate 19 to which is mounted a vertical translation stage 18 which can effect vertical movement along an axis up and down end plate 19 by rotation of adjustment screw 28.

An elongate vertical bar 20 is attached to translation member 18, which hangs vertically down below the level of mounting frame 10. At the lower end of vertical bar 20 is a sensor mounting plate 22 which, in-use, accommodates a sensor via bolt holes 36, as shown in FIG. 6.

Figure 4:
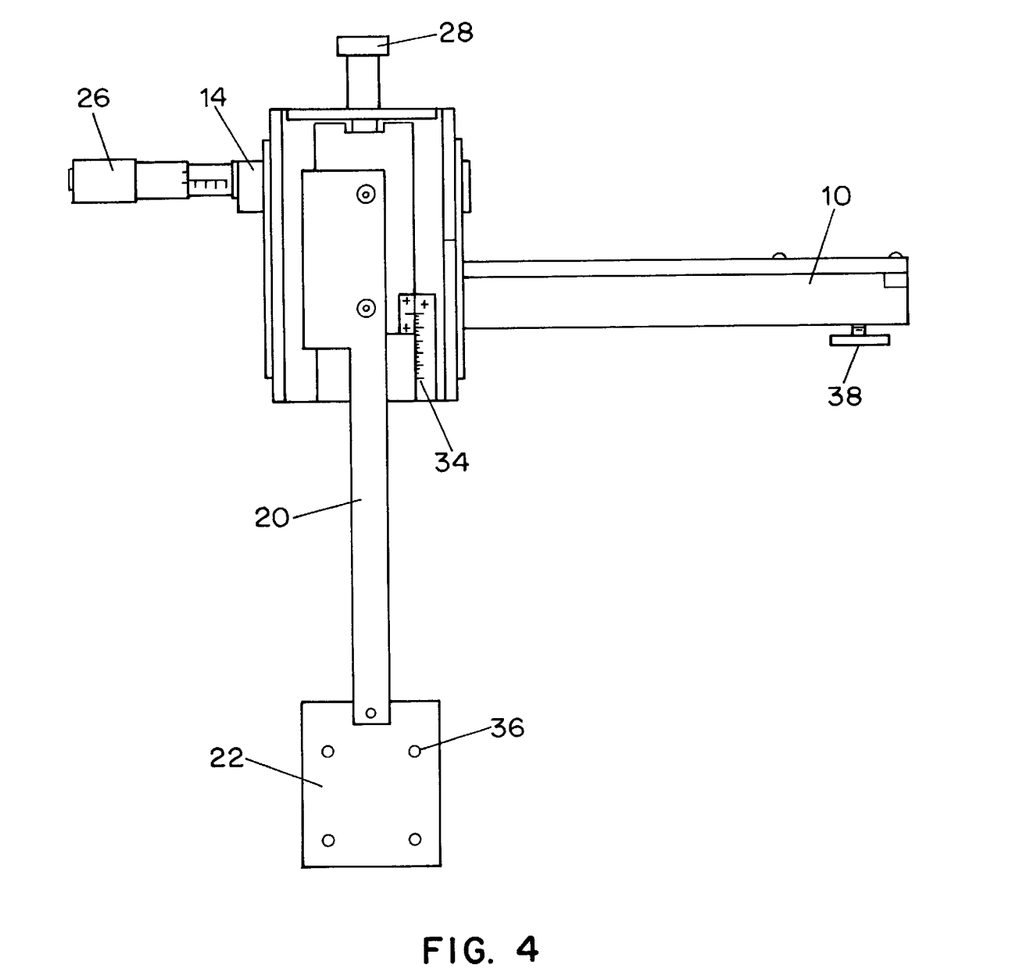
FIG. 4 is a front view of the sensor holder apparatus of FIG. 3.
Figure 5:
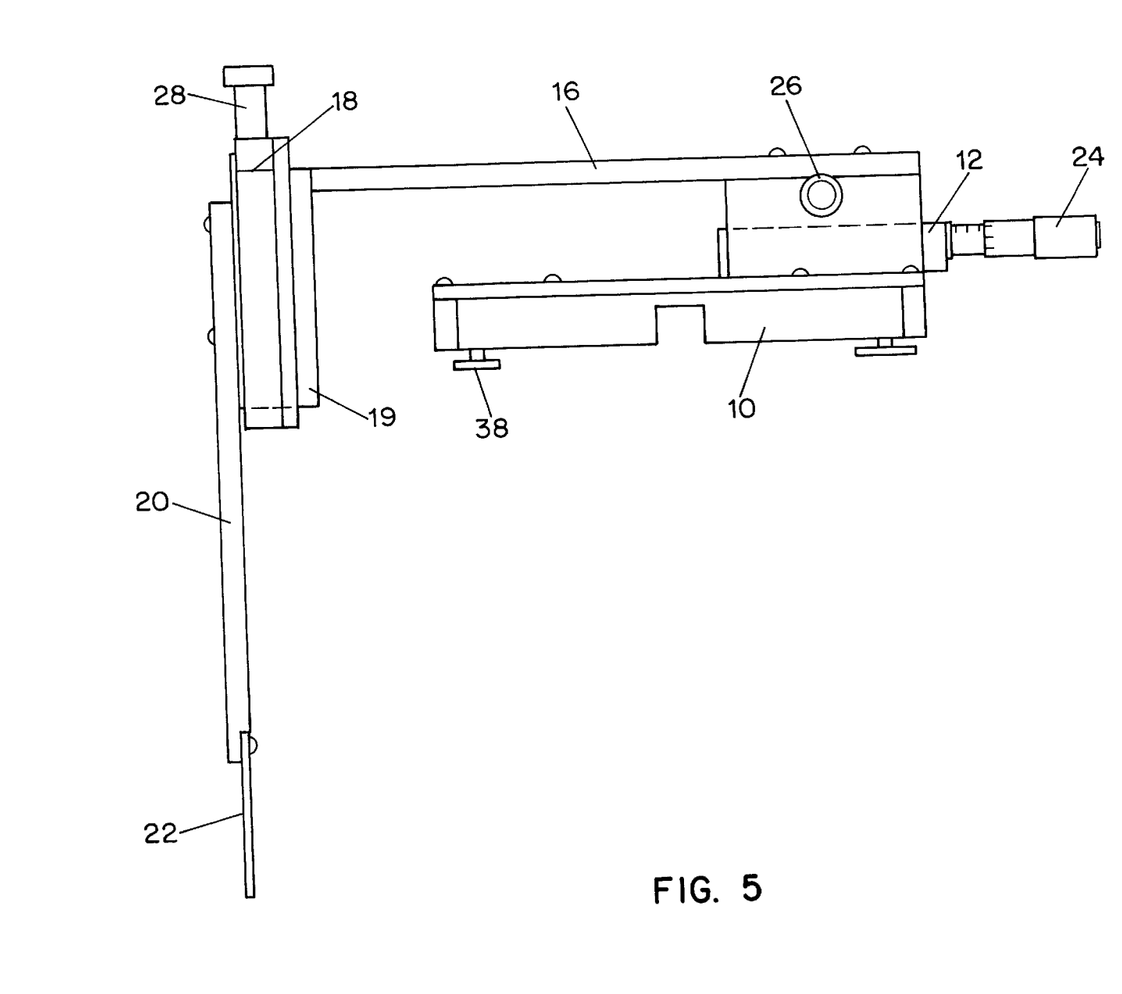
FIG. 5 is right side view of the apparatus of FIGS. 3 and 4.
Figure 6:
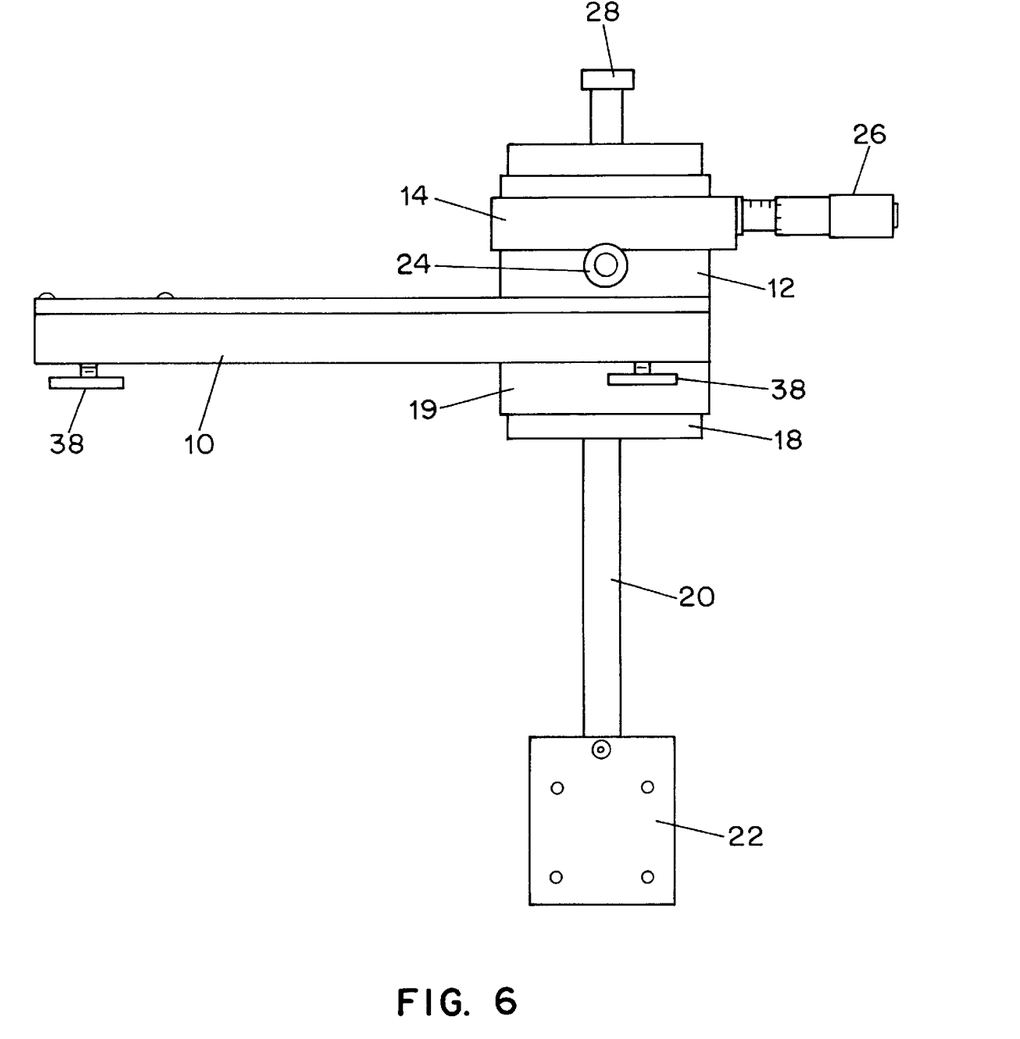
FIG. 6 is a rear view of the apparatus of FIGS. 3, 4 and 5.

During use, the mounting frame is placed on the upper surface 7 of the laser beam unit 1 and adjusted such that it lies horizontally by way of adjustable feet 38, as shown in FIGS. 4 to 6. The frame may in dedicated applications be fixed (e.g. bolted) directly to the surface 7.

A laser power sensor 8 (shown in FIG. 2B) is bolted onto sensor mounting plate 22 and the sensor holder and mounting frame moved into position on the laser power unit such that the sensor is positioned substantially in the path of the laser beam.

Rotation of adjustment screws 24 and 26 affords subsequent fine adjustment of horizontal movement in the two dimensions of the horizontal plane for the sensor mounting plate, 22 and hence the sensor attached. Rotation of adjustment screw 28 allows vertical movement of the sensor. By careful adjustment of all three screws the sensor mounting plate 22 and sensor can be positioned so as to be stationary in the path of the beam and exposed to the full cross-section of the beam.

As the laser power sensor 8 is held rigidly in place in the path of the beam, there is no variation in the position of the sensor once it is correctly placed. There are therefore no erroneous readings due to slight variations in the position of the sensor during a calibration or monitoring operation, which invariably happens in prior art arrangements where the sensor is hand-held.

Furthermore, once the sensor is in place and correctly aligned in the path of the beam the operator is free to move to a computer terminal such as that of a personal computer 100 linked to the laser beam unit and/or the sensor. As the sensor is held firmly in place in the path of the beam the operator can take multiple readings and perform any number of adjustments without having to constantly return to the laser beam unit and hold the sensor in place for the next reading.

The adjustment screws 24 and 26 have imprinted micrometer scales 30 and 32, respectively and vertical adjustment screw 28 has an imprinted Vernier scale 34. These scales allow highly accurate calibration of the optimum position of the sensor for any application and allows quick set up of the identical position if the same parameters are needed at a later date.

Where the sensor holder apparatus is fixed to the surface 7 (rather than mounted on adjustable feet), the sensor holder apparatus may be capable of being partially dismantled after calibration in order for the sensor to be moved from the path of the laser beam during direct imaging operations. Partial dismantling may involve leaving the mounting frame or some other part of it permanently attached to the surface 7 with quick release being provided for subsequent connection between that part and the rest of the sensor holder apparatus. It will be appreciated that this may be achieved in a great variety of ways.

The sensor holder may be fully dismantled for easy storage when not needed for long periods of time.

Although the supporting surface 7 of the laser beam unit 1 is shown as being a flat surface, it will be appreciated that embodiments of the present invention may be adapted so as to cooperate with curved surfaces. Such adaptations may involve a first part which has a first surface for surfaces arranged to cooperate with the curves of the laser beam unit in question, and another surface which is arranged to be substantially horizontal in use and to receive a second part of the apparatus, the second part being substantially as already described herein for mounting on flat surfaces. In this way, customized sensor holder arrangement may be provided to fit any particular laser beam unit as required.

It will also be appreciated that the applications of the present invention extend beyond the realm of direct laser imaging and that the apparatus may find utility in any application in which the power or other property of any laser beam needs to be measured.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A sensor holder apparatus for a laser power sensor, the apparatus comprising:
    (i) a base unit arranged for mounting on a supporting surface of a laser beam unit;
    (ii) a sensor mounting means arranged to be rigidly coupled to a laser power sensor by a connecting elongate bar therebetween; and
    (iii) an attachment means for movably attaching the sensor mounting means to the base unit, the attachment means being arranged for movement of the sensor mounting means into a position in which the sensor can be positioned in the path of a laser beam to be monitored and exposed to the whole cross-section of the laser beam wherein the attachment means comprises (i) first, second and third translation stages, and (ii) a plurality of adjustment means comprising adjustment screws, each adjustment means being coupled to each of the translation stages, each translation stage and each adjustment means being arranged to move the sensor mounting means with respect to the base unit along a different axis of movement.

2. The apparatus according to claim 1, wherein the supporting surface comprises a surface proximate to the laser beam.

3. The apparatus according to claim 1, wherein the laser is capable of being used in a direct imaging system.

4. The apparatus according to claim 1, wherein the three axes of movement are mutually perpendicular.

5. The apparatus according to claim 4, wherein the base unit comprises a frame, the first translation stage is movably coupled to the frame and the second translation stage is movably coupled to the first translation stage.

6. The apparatus according to claim 5, wherein the third translation stage is movably coupled to the second translation stage and is attached to the sensor mounting means.

7. The apparatus according to claim 5, wherein the apparatus additionally comprises a laser beam unit, and the frame is arranged for coupling with a surface of the unit.

8. The apparatus according to claim 7, wherein the surface of the laser beam unit is substantially flat and the frame is arranged to be directly coupled to the supporting surface.

9. The apparatus according to claim 7, wherein the supporting surface is non-flat, and the base unit comprises a first portion for coupling to the supporting surface and a second portion comprising the frame which is fixedly attached to or integral with the first portion and which provides the datum for manipulation of the attachment means.

10. The apparatus according to claim 1, wherein separate adjustment means are provided for each of the translation stages.

11. The apparatus according to claim 10, wherein rotational movement of the adjustment means is translated into linear movement of the respective translation stage.

12. The apparatus according to claim 1, wherein the adjustment means includes a printed visual scale for calibration purposes.

13. The apparatus according to claim 12, wherein the visual scale comprises a micrometer scale or a vernier scale.

14. The apparatus according to claim 1, wherein the apparatus is capable of being partially dismantled so that at least part of the base unit is retained permanently mounted to the supporting surface and at least one other part of the apparatus is capable of being removed from said part of said base unit.

15. A laser beam unit comprising a laser, a laser beam omitting part having at least an adjacent supporting surface, and a sensor holding apparatus comprising:
    (i) a base unit arranged for mounting on a supporting surface of the laser beam unit;
    (ii) a sensor mounting means arranged to be rigidly coupled to a laser power sensor by a connecting elongate bar therebetween; and
    (iii) an attachment means for movably attaching the sensor mounting means to the base unit, the attachment means being arranged for movement of the sensor mounting means into a position in which the sensor can be positioned in the path of a laser beam to be monitored and exposed to the whole cross-section of the laser beam wherein the attachment means comprises (i) first, second and third translation stages, and (ii) a plurality of adjustment means comprising adjustment screws, each adjustment means being coupled to each of the translation stages, each translation stage and each adjustment means being arranged to move the sensor mounting means with respect to the base unit along a different axis of movement.

16. A method of measuring the power of a laser beam, the method comprising:
    mounting a sensor holder apparatus on a supporting surface of a laser beam unit, the sensor holder apparatus comprising
        (i) a base unit arranged for mounting on a supporting surface of the laser beam unit;
        (ii) a sensor mounting means arranged to be rigidly coupled to a laser power sensor by a connecting elongate bar therebetween; and
        (iii) an attachment means for movably attaching the sensor mounting means to the base unit, the attachment means being arranged for movement of the sensor mounting means into a position in which the sensor can be positioned in the path of a laser beam to be monitored and exposed to the whole cross-section of the laser beam wherein the attachment means comprises (i) first, second and third translation stages, and (ii) a plurality of adjustment means comprising adjustment screws, each adjustment means being coupled to each of the translation stages, each translation stage and each adjustment means being arranged to move the sensor mounting means with respect to the base unit along a different axis of movement;
    manipulating attachment means of the sensor holder so as to bring about movement of the laser power sensor into a position in which the sensor is in the path of a laser beam and exposed to the whole cross-section of the laser beam to be monitored, and
    obtaining a power reading from the laser power sensor.

17. The method according to claim 16, wherein following measurement of the power of the laser beam, the power is adjusted to achieve a desired output power.

18. The method according to claim 17, additionally comprising processing laser power readings from the power sensor by processing means, displaying the processed readings on a display unit, and adjusting the power output of the laser beam unit by said processing means such that the effect of power adjustments is directly visible on the display unit.

19. The method according to claim 18, wherein the processing means and display unit are embodied in a personal computer.

* * * * *

UNITED STATES PATENT AND TRADEMARK OFFICE
CERTIFICATE OF CORRECTION

PATENT NO.    : 6,191,848 B1
DATED         : February 20, 2001
INVENTOR(S)   : Armitage It is certified that error appears in the above-identified patent and that said Letters Patent is hereby corrected as shown below:

Title page,
Item [57] ABSTRACT, line 9, "4" should read -- 4 --

Column 2,
Line 11, "bas" should read -- base --

Column 5,
Line 7, "4" should read -- 4 --
Line 13, "these" should read -- there --

Column 8,
Line 2, "omitting" should read -- emitting --
Line 52, "monitored, and" should read -- monitored; and --

Signed and Sealed this

Twenty-sixth Day of February, 2002

Attest:

JAMES E. ROGAN
Attesting Officer    Director of the United States Patent and Trademark Office